United States Patent [19]

Petitjean et al.

[11] 4,145,690
[45] Mar. 20, 1979

[54] CIPHERING DEVICE IMPROVING THE SECRECY OF THE ENCODED REPLIES OF A SECONDARY RADAR

[75] Inventors: Christian H. Petitjean, Fontenay-aux Roses; Maurice E. Marchand, Sevran; Marcel Denis, Paris, all of France

[73] Assignee: Le Materiel Telephonique, Boulogne-Billancourt, France

[21] Appl. No.: 822,636

[22] Filed: Aug. 8, 1977

[30] Foreign Application Priority Data

Aug. 12, 1976 [FR] France .................................. 76 24616

[51] Int. Cl.² .............................................. G01S 9/56
[52] U.S. Cl. ............................ 343/6.5 R; 343/17.2 PC
[58] Field of Search ....................... 343/6.5 R, 17.2 PC

[56] References Cited

U.S. PATENT DOCUMENTS

| | | | |
|---|---|---|---|
| 3,654,554 | 4/1972 | Cook | 343/6.5 R X |
| 3,969,725 | 7/1976 | Couvillion et al. | 343/6.5 R |
| 4,053,889 | 10/1977 | Johnson | 343/17.2 PC |

Primary Examiner—T.H. Tubbesing
Assistant Examiner—Richard E. Berger
Attorney, Agent, or Firm—Roland Plottel

[57] ABSTRACT

A secondary radar system in which the transponder and central station possess for enciphering and deciphering complementary dispersive filters having expansion/compression factors of $\theta \Delta F_1$, where $\Delta F_1 = 1/\Delta\mu$ is a measure of the spectral width of each reply pulse having a temporal width of $\mu$, $\theta$ being at least $s\mu/\Delta\mu$, such that at least two adjacent pulses spaced $s$ apart in the initial reply train are completely overlapped in the expanded reply.

The application to secondary radar systems, especially of the IFF type, in order to improve considerably the secrecy of the link between an airborne transponder and the ground station.

3 Claims, 8 Drawing Figures

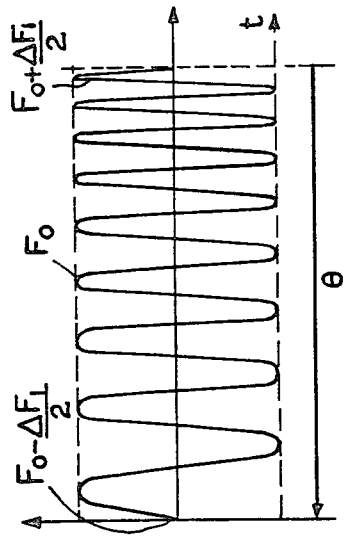
Fig.1a
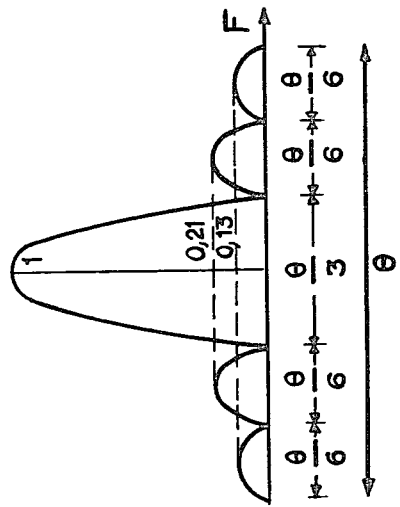
Fig.2a
Fig.1b
Fig.2b
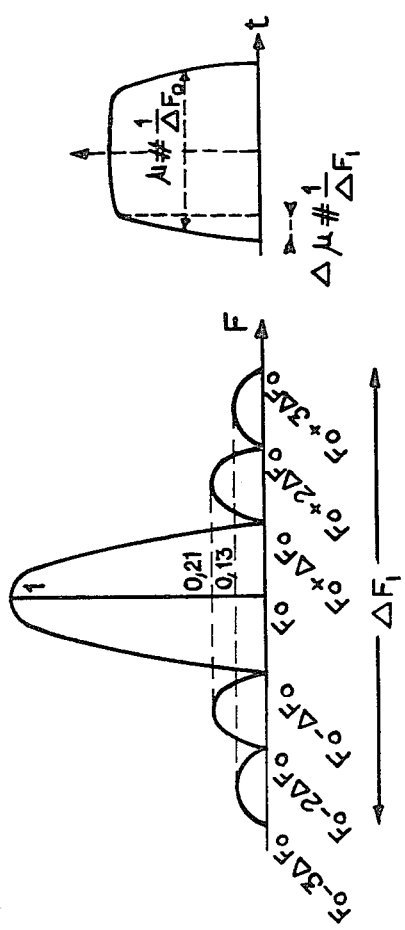
Fig.3
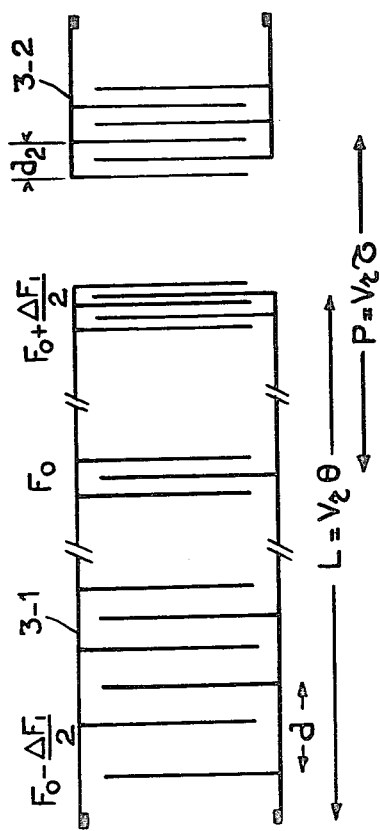

CIPHERING DEVICE IMPROVING THE SECRECY OF THE ENCODED REPLIES OF A SECONDARY RADAR

The present invention relates to a secondary radar system in which the mobile transponder and the receiver in the central interrogation station are fitted with an additional pulse expansion device and compression device respectively in order to improve the secrecy of the coded replies.

The invention relates more particularly to a system in which the said devices consists of two complementary dispersive filters built from tranducers using the properties of elastic surface waves.

(I) FORWARD

Secondary radars are mainly used in aeronautical radionavigation. In a system particularly well known as IFF and intended mainly for military applications, it is known that the process of signal exchange used consists in receiving and recognizing by means of a transponder in the aircraft an interrogation signal transmitted by a station, this interrogation signal being in the form of a pair of pulses with specified spacing, in sending back on a UHF carrier a signal in the form of a pulse train of specified rate and in which the pulse of each position in the train is either present or absent in accordance with a known code. For the general needs of air navigation, the structure of the coded replies has been defined by ICAO (International Civil Aviation Organization). These replies consist of two framing pulses spaced 20.3 μs apart and from 0 to 6 data pulses occupying positions spaced 2.9 μs apart. The different combinations of these data pulses correspond to 64 coded replies (identify, altitude, speed, emergency, etc.). All pulses have a width of 0.45 μs and their rise times must be less than 0.1 μs.

It is known that compared with the normal primary radar, for which the target is simply a purely passive reflector, a secondary radar for which the target is of an active nature has many advantages. Instead of receiving signals reflected by the target, the central station receives considerably higher level signals transmitted when requested by the interrogator associated with the target. With a few special precautions, the target is displayed on the central station radar screen by much clearer indications, independent of the nature of the target and free of interference. But the major advantage of secondary radar lies in the active role played by the target, which replies only if it has understood the interrogation, which implies a certain degree of secrecy, especially for military applications.

The main purpose of the present invention is to increase further this degree of secrecy by means of an enciphering process during transmission and a deciphering during reception of the coded replies, this process consisting essentially in modifying the form of the reply pulse train during transmission by widening — or expanding — in time each pulse, returning them to their initial widths during reception by means of a narrowing — or compression — process.

(II) CONTRIBUTION OF KNOWN ART IN THE INVENTION

For both primary and secondary radars, the signals detected by the central station receiver are basically of the same constitution, being high-frequency pulse-modulated signals in the case of normal radar or pulse trains in the case of a secondary radar, occurring at a certain rate.

Quantitatively, the radar equations are obviously different, since in the first case the distance (D) law is a function of $1/D^4$, and involves the extremely variable equivalent radar surface of the target, whilst in the second case, the law is a function of $1/D^2$ and independent of the nature of the target. Qualitatively, however, theoretical considerations over the last decades making it possible to improve conventional radars have been extended to secondary radars.

For a long time, a carrier transmitted by a conventional radar was simply amplitude-modulated by short pulses.

Theoretical studies have led to the following conclusions.

(a) All other factors being equal (antennas, transmission frequency, nature of the target), the effective maximum range of a radar does not depend on the shape of the transmitted signal nor on its spectral composition, but simply on its duration. In other words, two radars transmitting respective pulsed signals having a peak power of $P_w$ for a time $\mu$ and pulsed signals having a peak power of $P_w/r$ for a time $\mu r$ have the same range.

(b) For a given range, the range measurement error is inversely proportional to the "useful" width $\Delta f$ of the transmitted spectrum.

In the case of an older type of conventional radar, whose transmitted signal is simply amplitude-modulated by the pulses, the product $\mu \Delta f$ is constant (close to 1). It is therefore not possible by simple amplitude-modulation to increase the range for the same peak power or to decrease the peak power for the same range without decreasing $\Delta f$ at the same time, i.e. the accuracy of the measurement.

This problem has been solved by modulating the transmitted signal simultaneously in amplitude for the time $\mu$ and in frequency — linearly, for example — for a time $\theta$, considerably longer than $\mu$, the frequency excursion being, for example, $\Delta f$ about the carrier frequency $F_o$.

If $\theta \Delta f$ approximately equal to $\theta/\mu = r$ is sufficiently high, the transmitted spectrum has the same width $\Delta f$. For reception, a so-called "adapted" filter is used, i.e. a filter whose transfer function $H(F) = e^{j\phi(F)}$ is such that the argument $\phi(F)$ is equal to that of the transmitted signal — or of the received signal after reflection from the target — but of opposite sign. The adapted filter output signal is no longer frequency-modulated, and a signal of carrier frequency $F_o$ amplitude-modulated over a width $\mu$ close to $1/\Delta f$ is obtained.

In the case of conventional radars, the great advantage of the system is that for all other factors equal, the peak power transmitted by the radar can be divided by r.

It is seen, however, that the mean transmitted power is not changed, since even if the peak power is divided by r, the pulse width is multiplied by r.

In the case of conventional radars, many devices have been produced for modulating the carrier frequency $F_o$ simultaneously in amplitude and frequency, as well as many adapted filters. The latest devices use complementary "dispersive" filters as frequency-modulators during transmission and as the adapted filters during reception, these complementary filters having dispersions of $+\Delta f$ and $-\Delta f$ during the interval $\theta$.

In the case of conventional radar technique $r = \theta \Delta f = \theta/\mu$ is defined as the "compression ratio" or "expansion ratio", depending on whether the phenomena are being considered during reception or transmission.

(III) CHARACTERISTICS AND ADVANTAGES OF THE INVENTION

Expansion devices during transmission and compression devices during reception have not yet been used in secondary radar systems.

In accordance with one characteristic of the invention, the transmitter of the transponder possesses a first dispersive filter which modifies the shape of the coded reply pulse trains, and the central station receiver possesses a second dispersive filter which returns the pulse trains to their initial form, the two filters having equal delays $\theta$ and equal and opposite dispersions $\pm \Delta f$.

In general, the coded reply structure is as follows. Two framing pulses determine a time interval of (n + 1)s, surrounding n equidistant positions which can be occupied by 0, 1, 2, ... n pulses. The pulses of trapezoidal shape are defined by their half-power width $\mu$ and by the rise and fall times. The rise time is the shorter, being a maximum of $\Delta \mu$.

The shapes of the pulses on the output of the second dispersive filter at the reception end should reproduce as closely as possible those of the pulses fed to the first dispersive filter at the transponder end. Under these conditions, the band-widths of both dispersive filters — and therefore their dispersion $\Delta f$ — must be at least $\Delta F_1 = 1/\Delta\mu$.

Consequently, according to another characteristic of the system in accordance with the invention distinguishing it from those used by conventional radars, the required band-width is not $\Delta F_o = 1/\mu$, but $\Delta F_1 = 1/\Delta\mu$.

The reception compression ratio or the transmission expansion ratio is equal to $\rho = \theta \Delta F_1 = \theta \Delta F_o (\mu/\Delta\mu) = r (\mu/\Delta\mu)$.

The pulse transformed by the first dispersive filter and transmitted by the transponder extends over an interval $\theta$. The half-power width of the useful part — from the point of view of power — is $\theta(\Delta\mu/\mu)$. The remainder of the transformed pulse of duration $\theta(1 - [\Delta\mu/\mu])$ is required for transmitting correctly the band-width information $\Delta F_1$ of the initial pulse.

If the ratio $\Delta/\mu$ is sufficiently large, the transformed pulses are too wide and their edges are insufficiently sharp for easy decoding by a receiver not possessing the second dispersive filter. It is thus apparent that a simple transformation obtained by the addition of the first dispersive filter with a sufficiently large expansion ratio already enhances the degree of secrecy of the link.

The same advantage obtained for conventional radars is again present: the transmitted peak power is divided by the "apparent" expansion ratio $r = \rho(\Delta\mu/\mu)$.

In practice, the result of this reduced peak power is that the pulse trains are less easily detected, which again enhances the degree of secrecy of the link. Moreover, the reduction in transmitted peak power makes it possible to produce airborne transmitters of lower weight and smaller size.

In accordance with another characteristic of the invention, the degree of secrecy is considerably improved if $\theta$ is selected such that the useful parts of two initially neighbouring — i.e. separated by s — overlap after their transformation by the first dispersive filter. This result is obtained when $\theta(\Delta\mu/\mu) > s/2$. The optimum value $\theta_1$ of $\theta$ is $s\mu/\Delta\mu$. For this value, the two transformed pulses are combined into a single trapezoidal pulse having an upper level width of s and a peak power of $(\mu/\Delta\mu)(\mu/\theta_1) P_w$, where $P_w$ is the peak power of each initial pulse.

In practice, for this optimum value $\theta$, at least 7 coded replies out of 8 are made secret.

According to a characteristic of a perfected version of the invention, virtually absolute secrecy is obtained whatever the reply code (other than code $\phi$) between the two framing pulses provided $\theta$ has a value $\theta_n = (n/2) s (\mu/\Delta\mu)$. With this value, overlapping occurs either for two intially neighbouring pulses, or two pulses separated by 2 s, or two pulses separated by (n/2) s, where n is even.

The shape of the overlap pulses varies with the spacing and the number of initially overlapped pulses. The peak power of the overlap pulses varies between $(\mu/\Delta\mu)(\mu/\theta_n) P_w$ and $n/2 (\mu/\Delta\mu)(\mu/\theta_n) P_w$.

According to a characteristic of a preferred version of the invention, the first and second dispersive filters consist of so-called "adapted" filters using interdigitalized comb structures on piezo-electric surfaces propagating elastic waves (Rayleigh waves).

Adapted filters on piezo-electric substrates are small-size components and simple to use. For this reason, secondary radar systems fitted with devices in accordance with the invention can be easily rendered compatible with present conventional systems.

According to a characteristic of a practical variant of the invention, the transmitter of the transponder and the receiver of the central station each possess a "black box" connected in parallel with the present conventional channels, containing a reply pulse train "expansion" dispersive filter and a "compression" dispersive filter respectively. The "black boxes" can be switched in by, for example, a special pulse associated with the interrogation signals transmitted by the central station and recognized by the target transponder. The switchover from the normal channel to that fitted with the devices in accordance with the invention can be accomplished either manually or automatically.

(IV) PRACTICAL EXAMPLE AND DETAILED DESCRIPTION OF MEANS

The purposes and characteristics of the invention as well as the means employed appear more clearly from the following description of a practical example, this description being supplemented by the appended drawing in which:

FIGS. 1a, 1b, 2a, 2b and 4 are explanatory curves;

FIG. 3 illustrates a dispersive filter based on the properties of Rayleigh waves;

Figure 5:
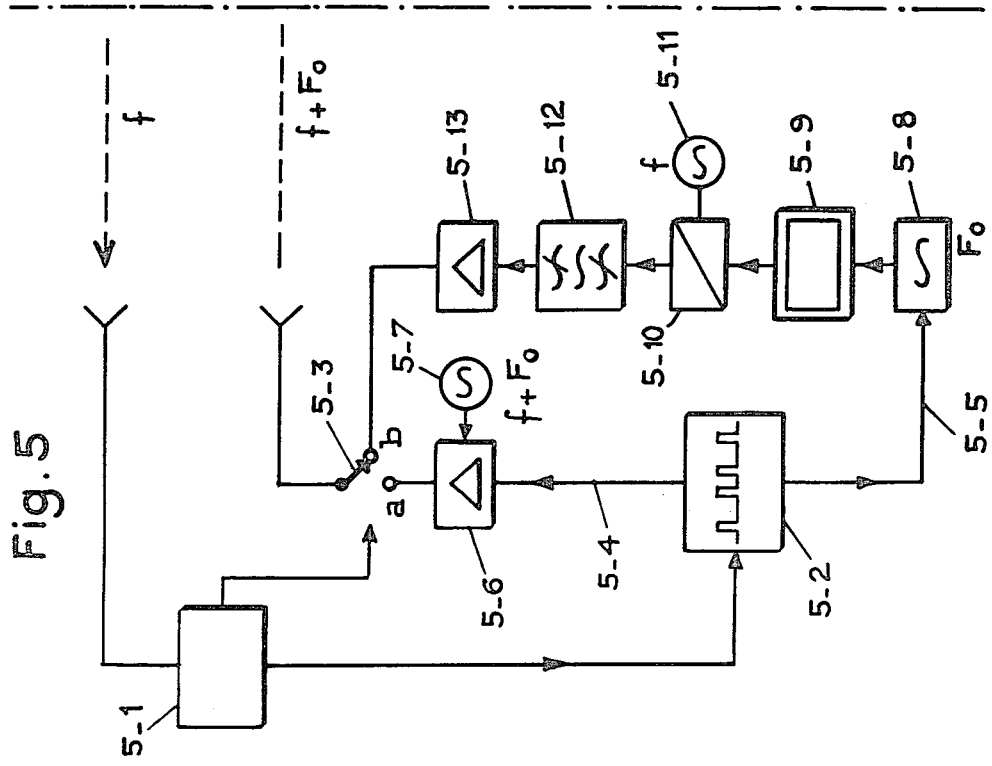

The transponder illustrated in FIG. 5 generates coded repy pulse trains which amplitude-modulate a carrier of high frequency $F_o$ of the order of 1 GHz.

A square pulse of width $\mu$ amplitude-modulating a signal of frequency $F_o$ can be represented spectrally by the following expression:

$$\frac{\sin(\pi \frac{\Delta F}{\Delta F_0})}{\pi \frac{\Delta F}{\Delta F_0}} \qquad \text{(expression 1)}$$

where ΔF is the frequency difference with respect to $F_o$ and where $\Delta F_o = 1/\mu$.

Accurate reproduction of the square pulse requires that the circuits processing the modulated signal possess a band-width $\Delta F_1$ much wider than $\Delta F_o$.

Since in fact most of the energy lies within a spectrum having a width of $2\Delta F_o$ about $F_o$, the circuits considered conserve the modulated signal shape fairly well provided $\Delta F_1$ is simply a few times greater than $\Delta F_o$. The consequence of this $\Delta F_1$ limitation is to transform the square input pulse into a symmetrical trapezoidal pulse whose rise and fall times Δμ are given approximately by $1/\Delta F_1$.

FIG. 1a indicates the modulation envelope spectrum on the output of a non-dispersive band filter of width $\Delta F_1 = 6\Delta F_o$. This spectrum possesses a main lobe having a base width of $2\Delta F_o$ and two pairs of secondary lobes, each having a width of $\Delta F_o$ and relative levels of approximately −13 dB and −18 dB. 99% of the input energy is obtained on the filter output.

The rise and fall times Δμ of the trapezoidal output pulse are approximately μ/6. This pulse is illustrated schematically in FIG. 1b.

Similarly, if the input pulse is trapezoidal with rise and fall times of Δμ considerably less than μ, it is not notably distorted provided $\Delta F_1 = 1/\Delta\mu$.

The first dispersive filter used in the invention behaves as an "all-pass" filter which lets through without modifying their relative amplitudes only those spectral components lying between $F_o - \Delta F_1/2$ and $F_o + \Delta F_1/2$ by assigning them relative phases which vary — linearly, for example — in accordance with the following law:

$$\phi_1(\Delta F) = -\pi\theta\Delta F_1(\frac{\Delta F}{\Delta F_1})^2 \qquad \text{(expression 2)}$$

where ΔF is equal to $F - F_o$ and F is a frequency within the band considered.

In order to obtain this phase characteristic in the first dispersive filter, the group delay $T_R$ should change linearly from $\tau + \theta/2$ at the frequency $F_o - \Delta F_1/2$ to $\tau - (\theta/2)$ at the frequency $F_o + \Delta F_1/2$.

If the input of such a dispersive filter is fed with a Dirac pulse (constant-amplitude and zero phase-change spectrum), a linearly frequency-modulated signal S is obtained — provided $\theta\Delta F_1$ is sufficiently large — which can be represented by:

$$S = \cos 2\pi (F_o t + \frac{\Delta F_1}{2\theta} t^2)$$

FIG. 2a shows the shape of signal S, which covers a width θ and is spectrally limited to the band of width $\Delta F_1$.

If the dispersive filter input is fed with the pulse whose spectrum is shown in FIG. 1a instead of a Dirac pulse, the signal on the output is determined by multiplying the amplitude of each sinusoid of FIG. 2a corresponding to an instantaneous frequency $F_o + \Delta F$ by the relative amplitude of the component of frequency $F_o + \Delta F$ of the spectrum in FIG. 1a.

The transformed pulse — or more exactly the transformed modulation envelope — is shown in FIG. 2b.

The curves of FIGS. 1a and 2b are exactly superposable: the role of the dispersive filter is to perform a frequency → duration transformation, θ replacing $\Delta F_1$.

The energy of the input pulse of duration μ lies almost totally in the main component of the transformed pulse in FIG. 2b, i.e. during an interval θ $(\Delta F_o/\Delta F_1)$. The peak power is in fact divided by $\theta\Delta F_o/\Delta F_1\mu$ (i.e. by $\rho(\Delta\mu/\mu)$, where ρ is the expansion factor $\theta\Delta F_1$).

Figure 6:
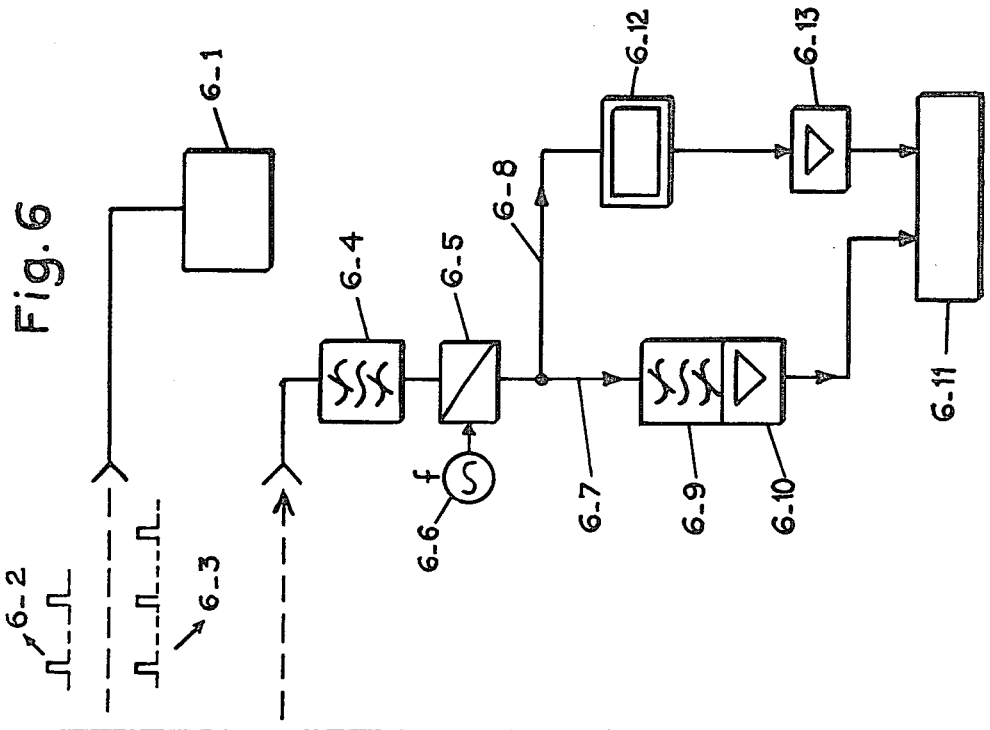
FIGS. 5 and 6 illustrate those parts of an airborne transponder and a ground station receiver/decoder helpful in understanding the invention (FIGS. 5 and 6 also illustrating schematically the ground station interrogation transmitter and the associated receiver/decoder of the airborne transponder).

If the receiver/decoder of the ground station in FIG. 6 is now considered, it is seen that it should possess the second complementary dispersive filter of the first dispersive filter incorporated in the transponder of FIG. 5. This second filter should have a group delay of $T_R$ which changes linearly from $\pi - (\theta/2)$ at frequency $F_o - \Delta F_1/2$ to $90 + \theta/2$ at the frequency $F_o + \Delta F_1/2$.

The relative phases on the output of the second filter are defined by:

$$\phi_2(\Delta F) = \pi\theta\Delta F_1(\frac{\Delta F}{\Delta F_1})^2.$$

Neglecting all phase changes without phase distortion occurring between the input of the first dispersive filter of the transponder and the output of the second dispersive filter of the ground station receiver/decoder, the part of the total phase change ($\phi_1 + \phi_2$) corresponding to the phase distortions is zero.

The second filter output signal is therefore free of phase distortion and consequently the frequency-modulation is eliminated. The signal whose spectrum and duration representations are shown in FIGS. 1a and 1b is obtained.

Since the delays θ to be obtained are high, the configurations selected for the first and second dispersive filters are based on the elastic wave properties of solid surfaces (Rayleigh waves) whose propagation velocity is $10^5$ smaller than that of electromagnetic waves. It is thus possible to obtain a non-dispersive delay of 10 μs over a length of 3 cm, whereas it would require 3000 m in space.

In the most general case, the solid is a small slab of piezo-electric material on which a pair of adjacent electrodes can operate as a wave generator. A voltage applied between these electrodes, more especially in the form of an interdigitalized comb deposited on the surface of the material creates an electric field between the teeth of the comb exciting Rayleigh waves on the material surface. A single transducer of this type can operate as both transmitter and receiver, since an elastic wave impinging on the comb produces an electrical voltage between its terminals. This transducer is selective, i.e. it is the equivalent of a band-pass filter centred on the frequency $V_R/2d$, where $V_R$ is the propagation velocity of the elastic waves and d is the distance between two adjacent teeth of the comb.

A dispersive filter may be produced by means of two transducers deposited on a single piezo-electric substrate. The structure of the device is shown schematically in FIG. 3 of the drawing appended to the text.

The first transducer (electromagnetic/acoustic consists of an interdigitalized comb 3-1 of length L, such that $L = V_R\theta$. Starting at the comb input, the distances d between adjacent teeth decrease linearly such that the first and last interdigital spaces constitute band-pass filters centred on frequencies $F_o - \Delta F_1/2$ and $F_o + \Delta F_1/2$ respectively. At a distance $1 = V_r\tau$ from the middle pair of teeth is found the second transducer 3-2 (acoustic/electromagnetic) constituted by an interdigitalized comb possessing N teeth spaced $d_2$ apart, where $d_2 = V_R/2F_o$. This second transducer acts as a band-pass filter having a width of $\Delta F_2 = 1.8F_o/(N-1)$.

N is selected such that $\Delta F_2 >> \Delta F_1$.

It is clear from the above that the device described constitutes a dispersive filter. The signal shown in FIG. 2b is obtained on the output of the second transducer. It is significant that the geometry of the device is similar in shape to signal S shown in FIG. 2a, time being replaced by length on the basis $T = L/V_r$.

The second dispersive filter complementary to the first is obviously constituted in the same manner and possesses the same dimensions with the difference that its first transducer is inverted compared with that of the modulator device, the spacing between teeth being narrower at the beginning and wider at the end.

The above means are adopted in the transponder (FIG. 5) and the ground station receiver/decoder (FIG. 6).

An interrogator 6-1 (FIG. 6) in the ground station radiates a signal with a carrier frequency f (e.g. f = 1030 MHz) modulated by the interrogation signals 6-2 or 6-3, depending on the nature of the required reply. The only difference between 6-3 and 6-2 is the addition of an extra pulse which is detected and recognized by the transponder of FIG. 5, enabling the latter to transmit expanded pulse train replies.

A receiver/decoder 5-1 (FIG. 5) of the airborne transponder, when it recognizes the interrogation, creates in a known manner a reply pulse train generated by a device 5-2. At the same time, depending on whether 5-1 has detected a 6-2 or 6-3 type of interrogation, an automatic or manual control changes switch 5-3 from position a to position b.

The reply pulse trains obtained from 5-2 occur on two different channels, designated 5-4 and 5-5.

The reply pulses on channel 5-4 modulate in a modulator/amplifier 5-6 a carrier signal of frequency f + $F_o$ ($F_o$ being 60 MHz for example) generated by a source 5-7.

If 5-3 is on position a, the transponder produces at a peak power level of $P_w$ signals of carrier frequency f + $F_o$ modulated by the normal reply pulses. These signals can be received by the receiver in the ground station of FIG. 6.

Channel 5-5 possesses in succession:
a generator 5-8 of frequency $F_o$ amplitude-modulated by the pulses generated by 5-2,
a first dispersive filter 5-9 based on the principles described above and possessing the structure shown in FIG. 3,
a mixer 5-10 fed with the signals obtained from 5-9 and those produced by a local oscillator 5-11 of frequency f,
a band-pass filter 5-12 of centre frequency f + $F_o$ and a spectral width of more than $\Delta F_1$ ($\Delta F_1$ being the spectral width of the modulated signal simultaneously in amplitude and frequency appearing on the output of 5-9),
an amplifier 5-12 which raises the peak power level of the expanded pulses produced by 5-9 to $(P_w/\rho)$ $(\mu/\Delta\mu)$.

If 5-3 is in position b, these expanded pulses are transmitted and can be received by the ground station receiver.

The signals of carrier frequency f + $F_o$ modulated by the normal or expanded interrogations reach the receiver/decoder in the ground station of FIG. 6. After being filtered in a band-pass filter 6-4 centred on f + $F_o$ and of a band-width greater than $\Delta F_1$, they are combined in the mixer 6-5 with the signals produced by a local oscillator 6-6 of frequency f. The output of 6-5 feeds two channels, 6-7 and 6-8.

Channel 6-7 possesses a band-pass filter 6-9 centred on $F_o$ and having a band-width of $\Delta F_1$, followed by an amplifier 6-10. The signal of carrier frequency $F_o$ appearing on the output of 6-10 and containing the transponder reply is detected and decoded by device 6-11.

Channel 6-8 possesses a second dispersive filter 6-12 complementary to 5-9 of FIG. 5, followed by an amplifier 6-13. The signal having a carrier frequency $F_o$ and appearing on the output of 6-13 and which contains the transponder reply reconverted to its initial form is detected and decoded by device 6-11.

If an expanded and therefore "ciphered" reply is obtained on the junction of channels 6-7 and 6-8, it produces a small-amplitude distorted signal on the output of 6-10, which device 6-11 fails to recognize as a reply to its interrogations. In this case, the reply is recognized on channel 6-8, being deciphered by 6-12.

Conversely, if a normal reply appears on the junction of channels 6-7 and 6-8, it produces a signal representing a reply on the output of channel 6-7 only.

It is possible to install a switch (not shown in FIG. 6) between channels 6-7 and 6-8, enabling the ground station operators to select one or the other of these channels, depending on whether an expanded or normal reply is expected.

A receiver possessing the devices of channel 6-7 only cannot receive, detect and decode easily an expanded reply obtained from the transponder of FIG. 5, since the pulse level is much lower than that produced by non-expanded pulses. They are much more "rounded", with much longer rise times, this effect increasing with $\theta(\Delta\mu/\mu)$.

This merely constitutes a difficulty, however, and not an impossibility.

The effectiveness of ciphering and therefore secrecy is considerably improved by selecting $\theta(\Delta\mu/\mu)$ such that several pulses in the expanded reply overlap.

Calculation shows that two initially adjacent pulses spaced by an interval s start to overlap in the expanded reply when $\theta (\Delta\mu/\mu) > s/2$.

The optimum value of $\theta$ is:

$$\theta_1 = s\mu/\Delta\mu$$

For this value, the two transformed pulses merge into a single pulse of trapezoidal shape having a peak width of s and peak level of $(\mu/\Delta\mu)$ $(\mu/\theta_1)$ $P_w$.

If it is considered that each of the $2^n$ possible encoded replies consists of (n + 2)-bit numbers, the extreme bits being "1's", simple calculation shows that there are $2^{n-1} + 2^{n-2} + 2^{n-3}$ encoded replies represented by pulse trains possessing at least two adjacent pulses.

It is seen that secrecy is completely guaranteed in 7 cases out of 8 if the above value of $\theta_1$ or a greater value is adopted.

Figure 4:
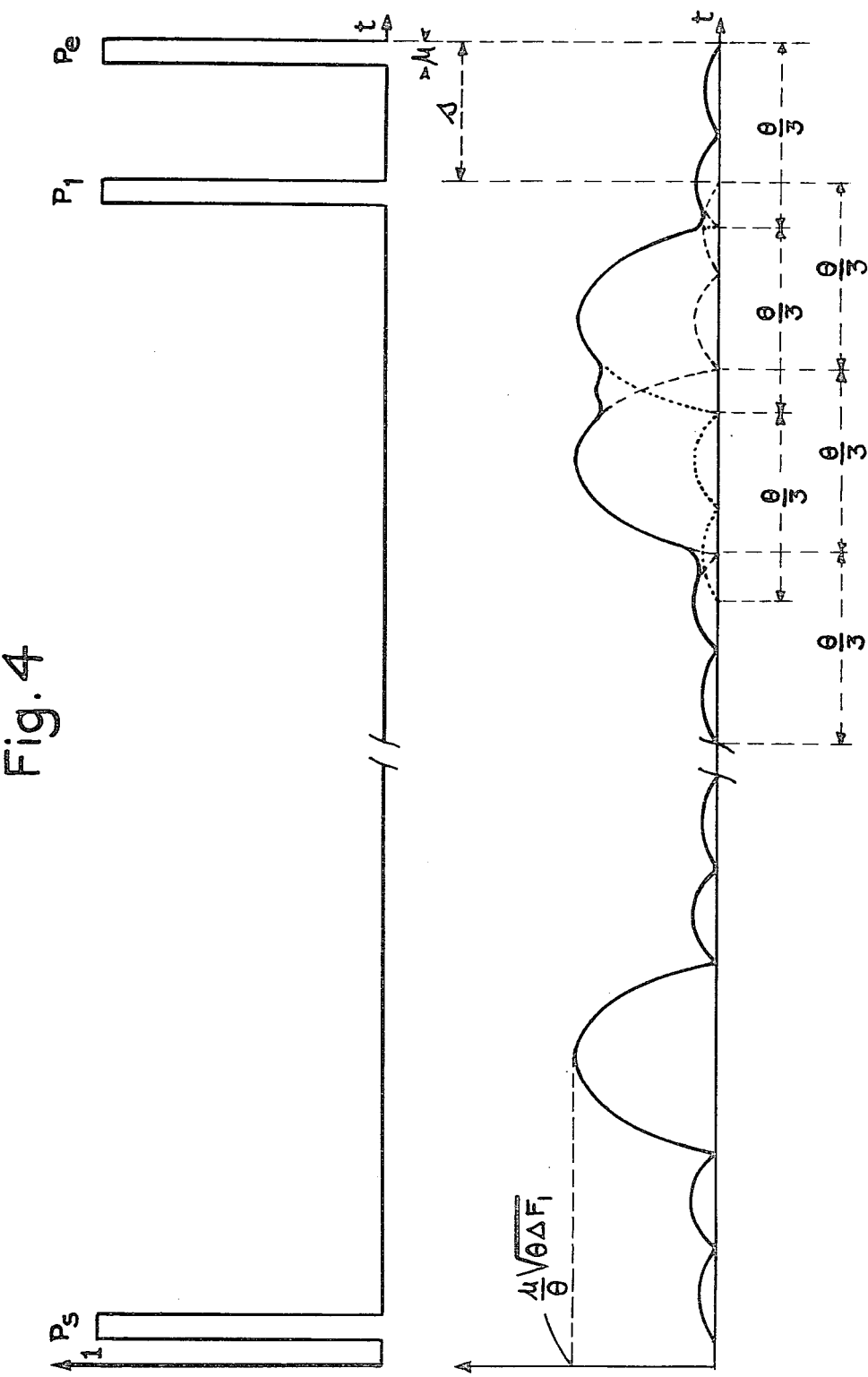

FIG. 4, which respects the relative amplitudes especially with regard to the pulses, shows:
a pulse train in the top part of the figure, possessing two framing pulses $P_e$ and $P_s$ and a data pulse $P_1$ symbolizing code 1, the expanded pulse train at the bottom of the figure, in which:

$$\theta = 24\mu$$

$$\Delta\mu = 1/\Delta F_1 = \mu/6$$

$$s = 6\mu$$

It is seen that $\theta(\Delta\mu/\mu) = 2/3\ s$

The expanded pulses $P_e$ and $P_1$ thus partially overlap and although two maxima just appear, secrecy is practically guaranteed for this code.

The relative amplitude of the single pulse containing the expansions of $P_e$ and $P_1$ is given by:

$$\sqrt{\frac{\mu}{\Delta\mu} \times \frac{\mu}{\theta}} = \frac{\mu}{\theta}\sqrt{\theta \Delta F_1} = \frac{1}{2}$$

Secrecy can again be improved by selecting $\theta\ (\Delta\mu/\mu)$ such that adjacent pulses completely overlap, as well as pulses separated by 2 s.

This result is best obtained when:

$$\theta = \theta_2 = 2s\mu/\Delta\mu$$

In the case of a 6-bit code (64 possible replies), secrecy is obtained for 56 expanded replies if $\theta$ has the value $\theta_1$, or for 61 expanded replies if $\theta$ has the value $\theta_2$.

For example, if $\mu = 0.5 \times 10^{-6}s$, $\Delta\mu/\mu = 1/6$ and $s = 6\mu$, the following are obtained:

$$\theta_1 = 18 \times 10^{-6}\ s,\ \text{with}\ \rho_1 = \theta_1 \Delta F_1 = 216$$

$$\theta_2 = 36 \times 10^{-6}\ s,\ \text{with}\ \rho_2 = \theta_2 \Delta F_1 = 432$$

Continuing this analysis, it is seen that virtually absolute secrecy is obtained when the value of $\theta$ is $\theta_n = (n/2)\ (s\mu/\Delta\mu)$.

In this case, only those representing the code $\phi$ avoid overlapping of the framing pulses.

In the above example:

$$\theta_n = 54 \times 10^{-6}\ s,\ \text{with}\ \rho_n = \theta_n \Delta F_1 = 648$$

The two complementary dispersive filters used in the equipment introduce a systematic delay between the transponder and the ground station decoder which can be calculated or experimentally measured such that the secondary radar operators can take it into account.

Although the principles of the present invention are described above in relation with a specific practical example, it should be clearly understood that the said description is given as an example only and does not limit the scope of the invention.

We claim:
1. In a secondary radar system of the type that includes at least one central station and at least one mobile transponder, an improved ciphering apparatus which comprises:
 enciphering means associated with said mobile transponder for overlapping adjacent data pulses in the data train sent in response to an interrogating signal from said central station; and
 deciphering means associated with said central station for separating the overlapped pulses received from said mobile transponder into separately decoded data pulses.

2. The ciphering apparatus according to claim 1 wherein for use in a radar system of a type that generates a reply pulse train having an interval s between adjacent data pulses, each pulse in said train having an amplitude-modulation duration $\mu$ and a rise-time $\Delta\mu$, said enciphering means comprises:
 means for generating a first carrier frequency signal;
 means for amplitude modulating said first carrier frequency signal with the data pulses of the train to be transmitted by said transponder;
 a dispersive filter centered on said first carrier frequency and having a group delay $\Theta$ higher than $s\mu/\Delta\mu$ for receiving said amplitude-modulated carrier frequency signal and for producing therefrom a pulse train with overlapped data pulses;
 means for generating a second carrier frequency signal;
 a mixer for mixing said second carrier frequency signal with the output of said dispersive filter; and
 a pass-band filter centered on the carrier frequency obtained by summing said first and second carrier frequency signals, said deciphering means comprising:
 a dispersive filter centered on said first carrier frequency and having a group delay which is equal to but of opposite direction to the group delay $\theta$ of the dispersive filter in said enciphering means, for receiving overlapped data pulses through the receiving arrangement of said central station thereby to derive the original coded pulse train.

3. The ciphering apparatus according to claim 2 wherein there are n coded data pulses in said reply pulse train, the dispersive filter in said enciphering means is centered on said first carrier frequency and has a group delay $\theta$ which is greater than $ns\mu/2\Delta\mu$, said filter receiving the amplitude-modulated first carrier frequency signal and producing therefrom a data pulse train with non-immediately adjacent data pulses overlapped.

* * * * *